United States Patent
Blaser et al.

(10) Patent No.: US 12,124,229 B2
(45) Date of Patent: Oct. 22, 2024

(54) PARAMETER MANAGER, CENTRAL DEVICE AND METHOD OF ADAPTING OPERATIONAL PARAMETERS IN A TEXTILE MACHINE

(71) Applicant: Maschinenfabrik Rieter AG, Winterthur (CH)

(72) Inventors: Niklaus Blaser, Brütten (CH); Christian Griesshammer, Berlingen (CH)

(73) Assignee: Maschinenfabrik Rieter AG, Winterthur (CH)

( * ) Notice: Subject to any disclaimer, the term of this patent is extended or adjusted under 35 U.S.C. 154(b) by 641 days.

(21) Appl. No.: 17/293,986

(22) PCT Filed: Nov. 15, 2019

(86) PCT No.: PCT/IB2019/059816
§ 371 (c)(1),
(2) Date: May 14, 2021

(87) PCT Pub. No.: WO2020/100092
PCT Pub. Date: May 22, 2020

(65) Prior Publication Data
US 2022/0004151 A1   Jan. 6, 2022

(30) Foreign Application Priority Data
Nov. 16, 2018  (EP) .................................... 18206649

(51) Int. Cl.
*G05B 13/02* (2006.01)
*D01G 21/00* (2006.01)
(Continued)

(52) U.S. Cl.
CPC .......... *G05B 13/029* (2013.01); *D01G 21/00* (2013.01); *D01H 13/32* (2013.01); *G05B 13/024* (2013.01); *G05B 13/027* (2013.01); *G05B 13/042* (2013.01)

(58) Field of Classification Search
CPC .. G05B 13/024; G05B 13/027; G05B 13/029; G05B 13/042; G05B 2219/45196; G05B 2219/32335
See application file for complete search history.

(56) References Cited

U.S. PATENT DOCUMENTS 6,263,257 B1 *  7/2001  Aemmer .............. G05B 13/027
                                                            700/47
6,438,534 B1 *  8/2002  Sorgel .................. G05B 13/027
                                                            706/45
(Continued)

FOREIGN PATENT DOCUMENTS

DE       39 24 779       1/1991
EP       0 541 483       5/1993
(Continued)

OTHER PUBLICATIONS

EPO Search Report, May 17, 2019.
(Continued)

*Primary Examiner* — Vincent H Tran
(74) *Attorney, Agent, or Firm* — Dority & Manning, P.A.

(57) ABSTRACT

A textile mill system and associated method include a plurality of spinning mills each having textile machines. A computer system determines adapted machine parameters for the textile machines and processes within the spinning mills. The computer system includes a receiving and transmitting section configured to receive operational information from the spinning mills and the textile machines, and a first database configured to store the received operational information. A processing section includes an optimizer
(Continued)

section with a neural network, wherein the neural network uses the operational information stored in the first database with processes for or derived from supervised or unsupervised machine or deep learning to determine the adapted machine parameters.

15 Claims, 2 Drawing Sheets

(51) Int. Cl.
*D01H 13/32* (2006.01)
*G05B 13/04* (2006.01)

(56) References Cited

U.S. PATENT DOCUMENTS

| | | | |
|---|---|---|---|
| 10,691,119 B2 * | 6/2020 | Locatelli | G05B 23/0283 |
| 11,036,483 B2 * | 6/2021 | Veljanoski | G06F 8/71 |
| 2015/0128596 A1 * | 5/2015 | Thompson | F01D 21/14 60/660 |
| 2020/0151575 A1 * | 5/2020 | Cabrera Arevalo | G06N 3/084 |
| 2020/0304993 A1 * | 9/2020 | Connell, II | H04W 8/16 |

FOREIGN PATENT DOCUMENTS

| | | |
|---|---|---|
| EP | 0 573 656 A1 | 12/1993 |
| WO | WO 2010/054497 A1 | 5/2010 |
| WO | WO 2017/072683 A1 | 5/2017 |

OTHER PUBLICATIONS

PCT Search Report and Written Opinion, Feb. 7, 2020.
Sevilla-Villanueva B., Sànchez-Marrè M., Fischer T.V. (2014) Estimation of Machine Settings for Spinning of Yarns—New Algorithms for Comparing Complex Structures. In: Lamontagne L., Plaza E. (eds) Case-Based Reasoning Research and Development. ICCBR 2014. Lecture Notes in Computer Science, vol. 8765. Springer, Cham.
Sevilla Villanueva B., Sànchez-Marrè M. (2012) Case-Based Reasoning Applied to Textile Industry Processes. In: Agudo B.D., Watson I. (eds) Case-Based Reasoning Research and Development. ICCBR 2012. Lecture Notes in Computer Science, vol. 7466. Springer, Berlin, Heidelberg.

* cited by examiner

PARAMETER MANAGER, CENTRAL DEVICE AND METHOD OF ADAPTING OPERATIONAL PARAMETERS IN A TEXTILE MACHINE

FIELD OF INVENTION

The invention concerns a computer system and a computerized method for determining adapted machine parameters for textile machines and processes within spinning mills.

BACKGROUND

Various raw materials are processed in spinning mills in several processing steps via intermediate products into yarns as end products. The raw materials pass through various work stations providing processing steps such as blowing, opening, cleaning, mixing, carding, combing, drafting, roving, fine spinning and finally spooling and winding. Machines are used for most steps which are equipped with sensors. The sensor signals are used for controlling the processing and/or for monitoring the quality of the produced intermediate and end products. There are several documents which are disclosing methods for optimizing a manufacturing process in a textile plant.

WO2010054497A1 relates to a method for optimizing with regard to quality, productivity and/or profitability a manufacturing process in a textile plant such as a spinning mill, weaving mill or embroidery plant, according to the preamble of the first claim. The method is applied when raw material is processed in the manufacturing process in several processing steps into intermediate products and an end product is produced. Parameters of the raw material, the intermediate products and/or the end product are measured in at least two different processing steps, stored in a database and linked in an index file. Thus the employed qualities of a lot are as close as possible to the quality of a lot which can also be designated as necessary quality of a lot in order to offer the yarn quality provided for a delivery agreement.

DE3924779 discloses a method and an apparatus for operating a process line in a spinning mill comprising various regions, for example comprising at least the regions blow room, spinning preparation and spinning, with each region being put together from several textile machines which operate in series and/or in parallel and form a machine plane, and with the individual series connected textile machines producing different fibre structures, wherein raw fiber material which enters into the blow room is obtained as spun yarn at the output of the spinning mill. The method is characterized in that one measures at least one quality feature of the respectively produced fibre structure at at least some textile machines in each of the named regions and uses it to regulate the respective textile machine or an earlier textile machine of the same region; and in that correction values are formed from at least some of the quality features measured in the spinning preparation and spinning regions and are used to influence the operation of a textile machine of an earlier region.

EP0541483 discloses a spinning mill having a process control computer for at least one group of machines, each machine of the group being provided with its own control which controls the actuator system of the machine (together with any possible auxiliary assemblies assigned to this machine). At least one network for the bidirectional communication between the computer and each machine of the group is provided. Control instructions from the process control computer are directed during the operation of the system to the machine controls via the network. Each machine control passes on the control instructions to the actuator system controlled by this control, the control instructions being converted, if necessary, by the machine control into control signals suitable for the actuator system.

An approach to estimation of machine settings for spinning of Yarn was given in the article Sevilla-Villanueva B., Sànchez-Marrè M., Fischer T. V. (2014) *Estimation of Machine Settings for Spinning of Yarns—New Algorithms for Comparing Complex Structures.* In: Lamontagne L., Plaza E. (eds) *Case-Based Reasoning Research and Development. ICCBR 2014. Lecture Notes in Computer Science*, vol 8765. Springer, Cham.

Furthermore, the approach of case-based reasoning is given in the article Sevilla Villanueva B., Sànchez-Marrè M. (2012) *Case-Based Reasoning Applied to Textile Industry Processes.* In: Agudo B. D., Watson I. (eds) *Case-Based Reasoning Research and Development. ICCBR 2012. Lecture Notes in Computer Science*, vol 7466. Springer, Berlin, Heidelberg.

The limitation of the CBR (CBR: Case Based Reasoning) approach lies in the fact that the new settings can only be determined within the given solution space of already existing data in the database, but not beyond.

SUMMARY OF THE INVENTION

A purpose of this invention is to provide an improved computer system and an improved computerized method for determining adapted machine parameters for textile machines and processes within spinning mills in order to increase production quality, reduce usage of raw material, reduced waste, and minimizing conversion costs like costs of energy, labour costs, maintenance costs and consumables costs as well as increase of production volume and ideal batch allocation to different machines within the spinning mill.

Additional objects and advantages of the invention will be set forth in part in the following description, or may be obvious from the description, or may be learned through practice of the invention.

The purposes are achieved by a computer system and a computerized method for determining adapted machine parameters for textile machines and processes within spinning mills as described herein.

Particularly, a computer system for determining adapted machine parameters for textile machines and processes within spinning mills with respect to at least one of the following: production quality, usage of raw material, reduced waste, conversion costs like costs of energy, labour costs, maintenance costs and consumables costs as well as increase of production volume and ideal batch allocation to different machines within the spinning mill comprises:
  a receiving and transmitting section configured to receive operational information from the spinning mills and the textile machines;
  a first database configured to store the received operational information;
  a processing section comprising an optimizer section comprising a neural network for determining adapted machine parameters, wherein the neural network uses algorithms for or derived from supervised, unsupervised, machine and/or deep learning, and wherein the neural network uses operational information stored in the first database.

Preferably, the optimizer section further comprises a Case-Based Reasoning (CBR) system and a mathematical control and filtering section configured to check the adapted machine parameters, wherein checking the adapted machine parameters includes applying probabilistic functions to the adapted machine parameters and to information derived from the Case-Based Reasoning system.

Preferably, the computer system is further configured to determine adapted machine parameters defining at least one of the following:
  raw material input;
  allocations of spinning machine to individual batches mix of raw material qualities;
  specific allocation of bales in a blow room;
  optimal use of textile machines;
  the operation of the textile machines;
  specific components of the textile machines;
  process settings and definitions;
  settings of auxiliary systems;
  definition of the material flow within the spinning mill;
  coordination of operators and their tasks with the spinning mill;
  coordination and allocation of human resources (labour) to different process steps.
  preventive or predictive maintenance of a textile machine.

Preferably, the computer system is further configured to receive operational information from the spinning mills and the textile machines which includes at least one of the following:
  plant identification information to identify a spinning mill;
  machine identification information to identify each textile machine of a plurality of textile machines;
  unit identification information to identify each machine unit of a plurality of machine units of the textile machine;
  information from sensors and auxiliary spinning devices.

Preferably, the computer system is further configured to implement a step of training the neural network in a first place on the basis of training data relating to quality surveyed production tests and trials having high quality of reliability, wherein the training data is preferably adjusted beforehand using information from a Case-Based Reasoning system and/or a mathematical control and filtering section applying traditional mathematical models Preferably, the computer system further includes one or more of:
  a second database having stored reference data regarding quality surveyed production tests and trials;
  a third database having stored empirical data collected from textile specialists of spinning mills or from textile technologists; and
  a fourth database having stored adapted machine parameters;
wherein the optimizer section and preferably the neural network are further configured to determine adapted machine parameters using one or more of data stored in the second database, of data stored in the third database, and of data stored in the fourth database.

Preferably, at least a part of one or more of the first database and if applicable the second database, the third database, and the fourth database is configured in the form of a unstructured database or in the form of a structured database.

Preferably, the computer system is further configured to determine a quality level of the received operational information, wherein the neural network is configured to use different weightings for different quality levels.

Preferably, the transmission section is further configured to transmit adapted machine parameters to the spinning mill and/or the textile machines.

Preferably, the processing section further includes a validity check section being configured to check the validity of adapted machine parameters.

The aims of the present invention are as well solved by a method of determining adapted operational parameters of machines and processes within spinning mills according to the corresponding independent claim. Particularly, a computerized method of determining adapted machine parameters of textile machines and processes within spinning mills with respect to at least one of the following: production quality, usage of raw material, reduced waste, conversion costs like costs of energy, labour costs, maintenance costs and consumables costs as well as increase of production volume and ideal batch allocation to different machines within the spinning mill comprises:
  receiving in a receiving and transmitting section of a computer system operational information from the spinning mills and the textile machines;
  storing in a first database of the computer system the received operational information;
  determining in a neural network of an optimizer section of a processing section of the computer system adapted machine parameters, wherein the neural network uses algorithms for or derived from supervised, unsupervised, machine and/or deep learning, and wherein the neural network uses operational information stored in the first database.

Preferably, the method further comprises checking the adapted machine parameters by applying probabilistic functions to the adapted machine parameters and to information derived from a Case-Based Reasoning system.

Preferably, the method further comprises determining adapted machine parameters defining at least one of the following:
  raw material input;
  allocations of spinning machine to individual batches mix of raw material qualities;
  specific allocation of bales in a blow room;
  optimal use of textile machines;
  the operation of the textile machines;
  specific components of the textile machines;
  process settings and definitions;
  settings of auxiliary systems;
  definition of the material flow within the spinning mill;
  coordination of operators and their tasks with the spinning mill;
  coordination and allocation of human resources (labour) to different process steps.
  preventive or predictive maintenance of a textile machine.

Preferably, the method further comprises receiving operational information from the spinning mills and the textile machines which includes at least one of the following:
  plant identification information to identify a spinning mill;
  machine identification information to identify each textile machine of a plurality of textile machines;
  unit identification information to identify each machine unit of a plurality of machine units of the textile machine;
  information from sensors and auxiliary spinning devices.

Preferably, the method further comprises implementing a step of training the neural network in a first place on the basis of training data relating to quality surveyed production tests and trials having high quality of reliability, and preferably adjusting the training data beforehand using information from a Case-Based Reasoning (CBR) system and/or a mathematical control and filtering section applying traditional mathematical models.

Preferably, the method further comprises determining adapted machine parameters using one or more of data stored in a second database, of data stored in a third database, and of data stored in a fourth database, the second database having stored reference data regarding quality surveyed production tests and trials, the third database having stored empirical data collected from textile specialists of spinning mills or from textile technologists, and the fourth database having stored adapted machine parameters Preferably, within the method said neural network accesses unstructured databases alone or in combination structured databases. In the method, the amount of data and the scope of data (additional data fields) increase over time. The use of traditional SQL databases generates some limits to this aspect, which can be advantageously overcome by NoSQL databases.

Preferably, the method further comprises determining a quality level of the received operational information, and using in the neural network different weightings for different quality levels. Advantageously, the quality level of collected data (trust worthiness, reproducibility, quality checks, etc.) is in that way taken into account.

Preferably, the method further comprises transmitting adapted machine parameters to the spinning mills and/or the textile machines.

When the first, second, third and/or fourth database is an unstructured database, an increasing amount of data and the scope of data (additional data fields) over time can be handled in this way.

When the central device includes a validity check section adapted to check the validity of the determined machine parameters by the parameter manager, the check section verifies the newly determined parameters of the machines and processes with the specified operation mode of the machine in order to avoid unspecified operational modes and prevent damages.

The advantage of the proposed approach including neural network alone or in combination with Cased-Based Reasoning (CBR) lies in the fact that the new settings can be determined outside the given solution space of already existing data in the databases.

The benefit of the present invention lies in the potential of neural network approaches to learn and optimise parameters of spinning mill machines, systems and process settings within the currently available frame of data as well as beyond that. The invention is suited to come up with adapted parameters and will automatically update its predictions based on the data gained during the operation.

BRIEF DESCRIPTION OF DRAWINGS

The invention will be better understood with the aid of the description of an embodiment given by way of example an illustrated by the figures, in which.

DETAILED DESCRIPTION OF THE INVENTION

Figure 1:
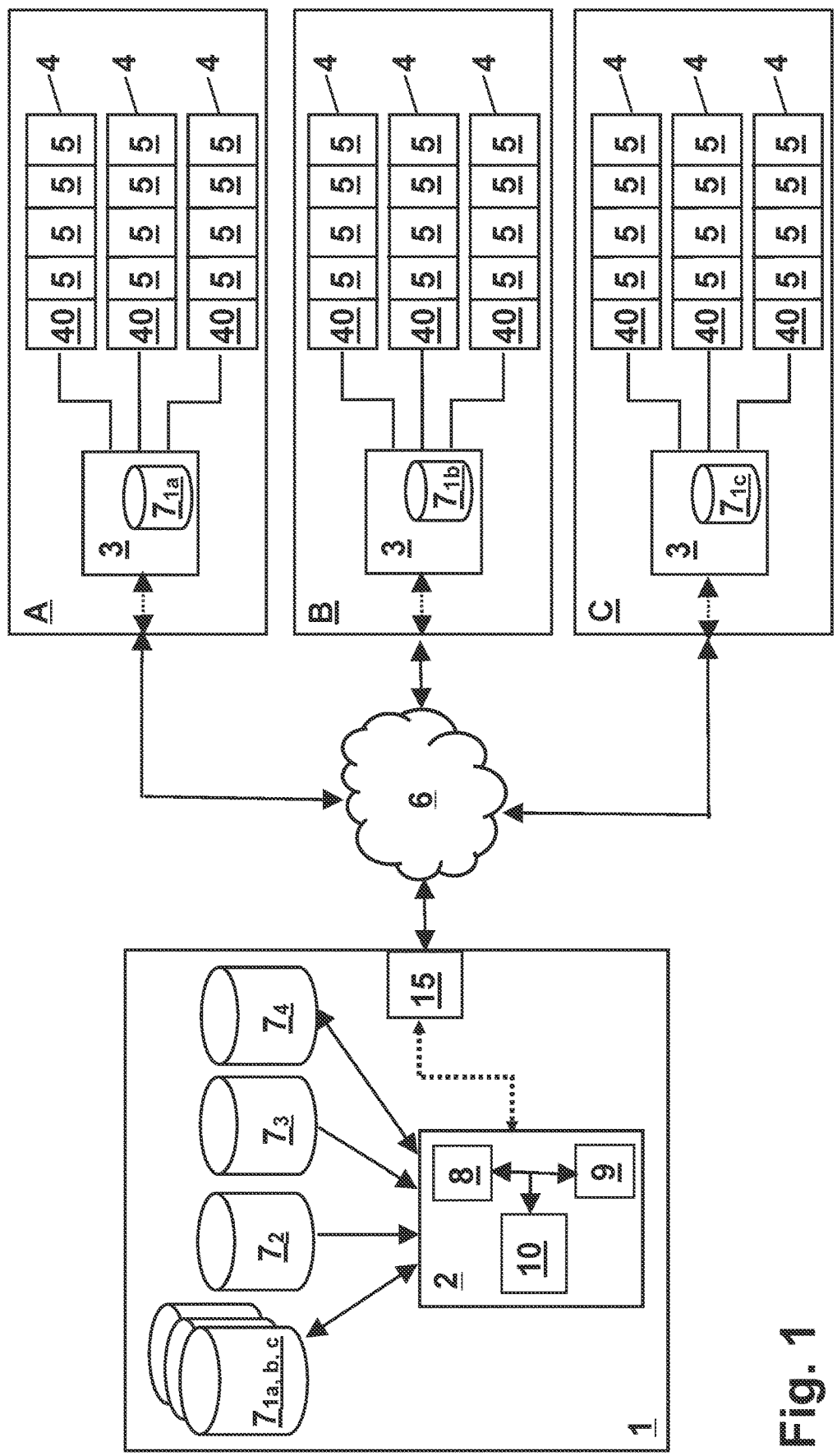
FIG. 1 shows an overview over the general configuration according to the invention.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

A first embodiment of the present invention will be described with reference to drawings. FIG. 1 is an outline of the general configuration according to the invention. FIG. 1 shows a computer system 1 comprising a processing section 2. FIG. 1 shows a plurality of spinning mills A, B, C. Three spinning mills A, B, and C are used to describe the embodiment of the present invention. The number of spinning mills A, B, C is not limited to three and may be more or less than three.

Each spinning mill comprises a terminal device 3, a number of textile machines 4, each having a control section 40 and a number of machine units 5. The computer system 1, the terminal devices 3, the control sections 40 are connected with each other via a communication network 6, such as, the Internet, a local area network (LAN), or a mobile telephone network. The computer system 1 is, e.g., a server computer or a personal computer. The computer system 1 is connected to the terminal devices 3 provided in each spinning mill A, B, C via the communication network 6. Due to limitations of space of a drawing, three textile machines 4 are illustrated in each spinning mill A, B, C in FIG. 1. However, the number of the textile machines 4 is not limited to three, and may be more or less than three. Likewise, the number of machine units 5 may be more than one. Further, in the embodiments of the present invention, different companies may own the spinning mill A, the spinning mill B and the spinning mill C, respectively. However, one company may own a plurality of spinning mills. For example, one company may own spinning mills A and B, and another company may own spinning mill C only.

In accordance with some embodiments, the computer system 1 includes one or more computer network interfaces, one or more processors, memory, and one or more programs. The one or more programs are stored in the memory and configured to be executed by the one or more processors. The memory may be volatile (such as random access memory (RAM)) and/or non-volatile (such as read-only memory (ROM), flash memory, etc). The one or more processors may be a central processing unit (CPU), a microprocessor, a multi-core processor, etc. The one or more programs include computer-executable instructions for performing the operations of the functions of the computer system 1 and/or the method steps as described in the present disclosure. The computer-executable instructions may be written in any suitable programming language. In accordance with some embodiments, a non-transitory computer readable storage medium has stored therein instructions, which, when executed by the computer system 1 having one or more computer network interfaces, memory and one or more processors, cause the computer system 1 to perform the operations of the functions and/or the method steps described herein. The non-transitory computer readable storage medium can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium. Based on the disclosure and teachings provided herein, a person of ordinary skill in the art will appreciate other ways and/or methods to implement the various embodiments. However, non-transitory computer-readable storage media does not include transitory media such as carrier waves or the like.

The textile machine 4 is a machine configured with a plurality of the machine units 5. The textile machines 4 can be e.g., a bale opener, a card, a regulated or not regulated draw frame, a comber preparation machine or a comber, an end spinning device such as a ring or compact spinning machine, a rotor spinning machine, an air-jet spinning machine, an automatic winder, a roving frame, a weaving machine, a knitting machine, a yarn winding machine, a draw texturing machine, or the like. Additionally, the spinning mills A, B, C may comprise auxiliary spinning devices like air pressure systems, transport systems, climate control systems, security and surveillance systems and the like.

In the embodiments of the present invention, a description will be made, as an example, on the assumption that the textile machine 4 is a rotor spinning machine in which a plurality of machine units 5 produces high quality yarn from a roving. The textile machine 4 is provided with the control section 40 that controls each machine unit 5. Additionally the textile machine 4 is provided with a plurality of sensors in order to sense the quality of the processed material and to collect operational information about the operational status of the components of each machine unit 5. The control section 40 transmits information on quality features of material processed by the textile machines 4 and the machine units 5 and the actual operational information of the textile machine 4 and the machine units 5 to the terminal device 3. The terminal device 3 may be a personal computer. Instead of a personal computer, the terminal device 3 may be a device specifically designed for controlling the textile machine 4.

Examples of operational information relating to quality features of material processed by the textile machines 3 can be taken from FIG. 5, 6 of DE3924779A1 although others could be possible. The terminal device 3 of each spinning mill transmits the information relating to quality features of material processed by the textile machines 4 to the computer system 1. The computer system 1 comprises a receiving and transmitting section 15 adapted to receive from the spinning mills A, B, C and the textile machines operational information, which operational information may include:

plant identification information to identify a spinning mill A, B, C;
machine identification information to identify each textile machine 4 of a plurality of textile machines 4 connected to the terminal device 3;
unit identification information to identify each machine unit 5 of a plurality of machine units of the textile machine 4; and
a plurality of pieces of operational information as shown below e.g. on quality features of material processed by the textile machines 4 and the units 5 and data collected from the spinning mill A, B, C.

Based on the operational information of the textile machines 4 and the machine units 5 the computer system 1 determines by means of the processing section 2 adapted machine parameters.

The adapted machine parameters according to the present invention and determined by the processing section 2 may include:

raw material parameters; e.g. as seen in FIG. 5 ("Rohmaterial") of DE3924779A1.
production flow parameters, e.g. spinning plan and use of machines.
maintenance and wear status of textile machines 4 and components;
operator typical parameters, e.g. operator specific preferences and errors;
quality parameter of intermediate and final products, e.g. mass variations, tenacities, fibre orientation or others as seen in FIG. 5, 6 of DE3924779A1;
settings of the textile machines and components.

As illustrated in FIG. 1, the computer system 1 includes four different databases $7_{1a, b, c}$, $7_2$, $7_3$, $7_4$.

The first database $7_{1a, b, c}$ is configured to store the operational information received by the receiving section 15, which operational information in particular includes the plant identification information, the machine identification information, the machine unit identification information and the time. Each spinning mill A, B, C, etc. may have an own database $7_{1a, b, c}$, which stores operational information of the respective spinning mill A, B, C. The data of the first database or at least parts of the data of these first databases $7_{1a, b, c}$ stored in the computer system 1 comprises measured data from machines and sensors and covers all operational aspects of a spinning mill A, B, C. The amount of data and the scope of data (additional data fields) increase over time. The use of traditional SQL databases generates some limits to this aspect, which can be overcome by NoSQL databases.

Additionally the computer system 1 comprises a second database $7_2$ having stored reference values regarding reference data of quality surveyed production tests and trials. As an example this could include setting parameters, raw material data, information about end and semi-finished product data and data about environmental and production process data.

The computer system 1 comprises a third database $7_3$ having stored empirical data collected from textile specialists of spinning mills or textile technologists.

The computer system 1 comprises a fourth database $7_4$ having stored (previously determined) adapted machine parameters, based on parameter request 14 and based on data of the databases $7_{1a, b, c}$, $7_2$, $7_3$, $7_4$.

Although four different databases $7_{1a, b, c}$, $7_2$, $7_3$, $7_4$ are shown in the FIG. 1, 2, it is clear that a single database could include all mentioned data. The mentioned data in the first, second, third and fourth database $7_{1a, b, c}$, $7_2$, $7_3$, $7_4$ can grow to a huge amount of data known as big data.

As mentioned already above the present invention uses unstructured databases (NoSQL databases, data warehouses or data lakes) alone or in combination with structured databases in spinning mill systems and platforms. Some of the currently known unstructured databases are Hadoop, Cassandra, Hypertable, Accumulo, Amazon Simple DB, Cloud Data, HPCC, Flink, Splice, MongoDB, Elastic Search, Couchbased Server, Couch DB, RethinkDB, RavenDB, MarkLogic Server, Clusterpoint Server, NeDB, Terrastore, JasDB, RaptorDB, Djoindb, EDB, Amisa Server, DensoDB, SisoDB, SDB, UnQLite, ThruDB, TimescaleDB. Many additional unstructured (NoSQL) databases exist for Key Value/Tuple Store databases, graph databases, multi-model databases, object databases, grid and cloud databases, XML databases, multidimensional databases and network model databases. The benefit using unstructured databases alone or in combination with structured databases is there qualification for big data analytics, machine learning and deep learning methodologies for the adaptation of spinning mill parameters and spinning mill processes.

Figure 2:
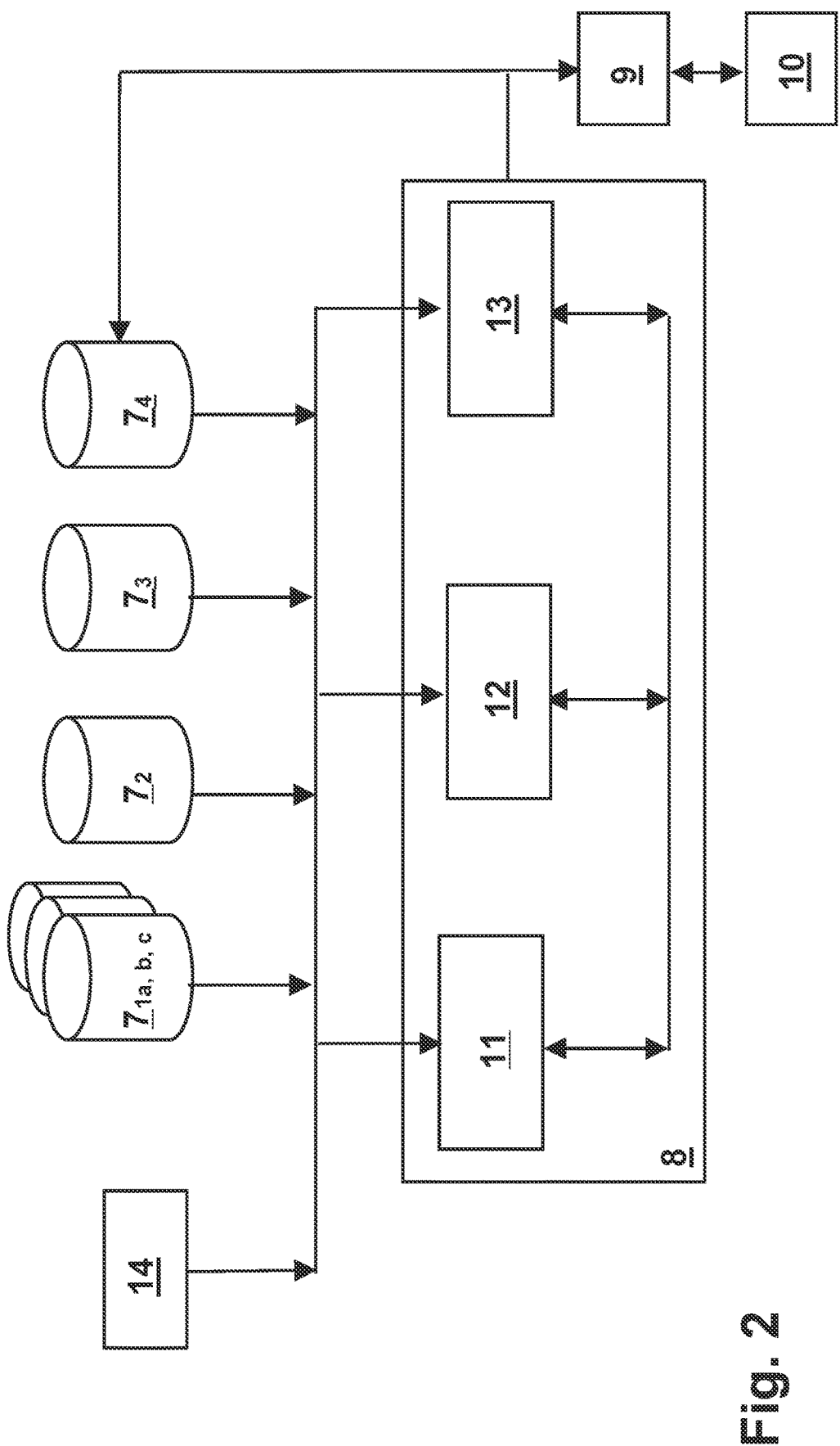
FIG. 2 shows an overview of a processing section and databases according to the present invention.

FIG. 2 shows an overview of a processing section 2 and databases $7_{1a,\ b,\ c}$, $7_2$, $7_3$, $7_4$ according to the present invention. The processing section 2 includes an optimizer section 8, adapted machine parameters 9 and a validity check section 10. The optimizer section 8 includes a Case-Based Reasoning (CBR) system 11, a neural network 12 and a mathematical control and filtering section 13. According to the present invention the collected data, namely the data stored in the databases $7_{1a,\ b,\ c}$, $7_2$, $7_3$, $7_4$, is analysed using the optimizer section 8, which implements artificial intelligence algorithms comprising a neural network 12 alone or in combination with the Case-Based Reasoning (CBR) system 11 and traditional mathematical models used in the mathematical control and filtering section 13. The approach of case-based reasoning itself in spinning mills is given in the article Case-Based Reasoning Applied to Textile Industry Processes as cited in the prior art section.

During the method according to the present invention, in a first step the neural network 12 is trained or trains itself with data from the databases $7_{1a,\ b,\ c}$, $7_2$, $7_3$, $7_4$. During this step, algorithms are built in order to solve in a second step a specific parameter request 14 by the neural network 12. Such a specific parameter request 14 can be a request for any adapted machine parameter as defined above. In a third step, the adapted machine parameters are calculated with the neural network 12, and are checked on plausibility by the Case-Based Reasoning (CBR) system 11 and/or the mathematical control and filtering section 13. The difference between the adapted machine parameters determined by the neural network 12 and the adapted machine parameters checked by the Case-Based Reasoning (CBR) system 11 and/or the mathematical control and filtering section 13 is assigned a probability value, for example in accordance to one or more probabilistic functions. Depending on the probability value, within the processing unit 8 adapted machine parameters determined by the neural network 12 and the Case-Based Reasoning (CBR) system 11 and/or the mathematical control and filtering device 13 are assigned respective weights for recalculating the adapted machine parameters, or are chosen according to the probability value.

Before the training of the neural network 12, when only limited data is available, it would be possible to train the neural network 12 on the basis of training data from the second database $7_2$ having stored reference data of quality surveyed production tests and trials, which are data with high quality of reliability. Furthermore, the training data could be adjusted beforehand with the Case-Based Reasoning (CBR) system 11 and/or the mathematical control and filtering section 13.

Upon receipt of a parameter request 14, the optimizer section 8 determines adapted machine parameters 9 using the neural network 12 alone or in combination with Case-Based Reasoning CBR system 11 and traditional mathematical models. The neural network 12 comprises algorithms for supervised, unsupervised, machine and/or deep learning. The approach of using only the neural network 12 requires a lot of data (Big Data) for training the neural network 12 before it reaches its operational performance (unsupervised learning approach, deep learning). In order to minimize this effort, results from the Case-Based Reasoning (CBR) system 11 and data from database $7_2$, $7_3$ are taken into account and lead to a supervised learning approach, while supporting the feature extraction process which is characterising the machine learning process. The data in the databases $7_{1a,\ b,\ c}$, $7_2$, $7_3$, $7_4$ has different origins and therefore different quality levels e.g. trust worthiness, reproducibility, quality checks, etc. Thus, in the mentioned algorithms of the optimizer section 8, the data from the databases $7_{1a,\ b,\ c}$, $7_2$, $7_3$, $7_4$ might be weighted in accordance to a quality level assigned to the data. The benefit of this approach lies in the fact that the overall quality of adapted machine parameters can be controlled and disturbing impacts of unqualified data can be limited.

As a result, adapted machine parameters 9 are outputted. Adapted machine parameters 9 in the present invention can define:
raw material input;
allocations of spinning machine to individual batches mix of raw material qualities;
specific allocation of bales in a blow room;
optimal use of textile machines 4;
the operation of the textile machines 4;
specific components of the textile machines 4;
process settings and definitions;
settings of auxiliary systems;
definition of the material flow within the spinning mill A, B, C;
coordination of operators and their tasks with the spinning mill A, B, C;
coordination and allocation of human resources (labour) to different process steps.
preventive or predictive maintenance of a textile machine 4.

The determined adapted machine parameters 9 are as well stored in the fourth database $7_4$ in order to enrich the collection of determined adapted machine parameters. This helps to improve the stability, the quality as well as the speed of subsequent parameter determinations.

The receiving and transmitting section 15 of the computer system 1 is further configured to transmit determined adapted machine parameters to the spinning mills A, B, C, the textile machines 4 and the machine units 5. According to the determined adapted machine parameters, either machine settings are adapted automatically or an operator adapts the spinning process manually. The terminal device 3 of a spinning mill A, B, C may include a display unit for displaying adapted machine parameters.

Once adapted machine parameters 9 are determined and before they are transmitted to the corresponding machine, they can be checked by a validity check section 10 adapted to check the validity of the machine parameters. For example, the validity check section 10 verifies if the newly determined machine parameters 9 of the machines comply with the specified operation mode of the machine in order to avoid unspecified operational modes and prevent damages. The validity check section 10 can be part of the processing section 2 or of the computer system 1.

The databases $7_{1a,\ b,\ c}$ are updated with operational information from the spinning mills A, B, C, which results from the adapted machine parameters.

The advantage of the proposed approach including neural network 12 alone or in combination with Cased-Based Reasoning (CBR) 11 and/or the mathematical control and filtering section 13 lies in the fact that the new adapted machine parameters can be determined outside the given solution space of already existing data in the databases $7_{1a,\ b,\ c}$, $7_2$, $7_3$, $7_4$.

The benefit of the present invention lies in the potential of neural network approaches to learn and optimise parameters of spinning mill machines, systems and process settings within the currently available frame of data as well as beyond that. The invention is suited to come up with adapted machine parameters and will automatically update its predictions based on the data gained during the operation.

Combining the neural network and the Case-Based Reasoning system enables that the distance between each attribute can be limited in order to exclude adapted machine parameters which are too different or not relevant. Matching adapted machine parameters can be determined using autocompletion. Similar adapted machine parameters can be determined which already have been used, documented or approved. The neural network can be subdivided into several neural networks, wherein per spinning mill A, B, C or per textile machine 4 adapted machine parameters can be determined using the several neural networks, and wherein the Case-Based Reasoning system can be used to find the best overall optima.

The Case-Based Reasoning system may include information relating to automation, such as for managing automated guided vehicles for finding best routes through a spinning mill or a strategy as regards the order of serving textile machines. The Case-Based Reasoning system may include information relating to quality, such as enabling searching for similar (old) records for finding already documented adapted machine parameters. The Case-Based Reasoning system may include information relating to maintenance, such as grouping of maintenance activities affecting particular textile machines, also in view of produced articles or personnel resources. The Case-Based Reasoning system may include information relating to production planning, such as a point in time for switching an article on a particular textile machine for best cost/benefit ratio. The quality level of operational information may take into account non-complete data sets, time shifted records, missing data sets due to network failures/speed/congestions, variance in measured values (e.g. for non-calibrated sensors), etc. Training of a neural network can take into account the quality level and enable a model that can overcome respective shortcomings.

REFERENCE NUMBERS

1 Computer system
2 Processing section
3 Terminal device
4 Textile machine
40 Control section of textile machine 4
5 Machine unit of textile machine 4
6 Communication network
$7_{1a,b,c}$ First database (operational information of spinning mills A, B, C)
$7_2$ Second database (quality survey production tests and trials)
$7_3$ Third database (empirical data from textile specialists)
$7_4$ Fourth database (adapted machine parameters)
8 Optimizer section
9 Adapted machine parameters
10 Validity check section
11 Case-Based Reasoning system
12 Neural network
13 Mathematical control and filtering section
14 Parameter request input
15 Receiving and transmitting section
A,B,C Spinning mills

The invention claimed is:

1. A textile mill system, comprising:
a plurality of spinning mills, each of the spinning mills comprising a plurality of textile machines;
a computer system configured to determine adapted machine parameters for the textile machines and processes within the spinning mills for one or more of the following: production quality, usage of raw material, reduced waste, conversion costs including one or more of costs of energy, labor costs, maintenance costs and consumables costs, increase of production volume, and ideal batch allocation to different ones of the textile machines within the spinning mills, the computer system comprising:
a receiving and transmitting section comprising network interfaces, memory, and processors executing programs such that the receiving and transmitting section receives operational information from the spinning mills and the textile machines;
a first database configured to store the received operational information;
a processing section comprising an optimizer section with a neural network, wherein the neural network uses the operational information stored in the first database with processes for or derived from supervised or unsupervised machine or deep learning to determine the adapted machine parameters, wherein the optimizer section further comprises one or both of a Case-Based Reasoning system and a mathematical control and filtering section configured to check the adapted machine parameters by assigning a probability value to a difference between the adapted machine parameters and information derived from the Case-Based Reasoning system and the mathematical control and filtering section.

2. The textile mill system according to claim 1, wherein the adapted machine parameters define one or more of one of the following:
raw material input;
allocations of spinning machines to individual batch mixes of raw material qualities;
specific allocation of bales in a blow room;
optimal use of textile machines;
operation of the textile machines;
specific components of the textile machines;
process settings and definitions;
settings of auxiliary systems;
definition of material flow within the spinning mills;
coordination of operators and their tasks with the spinning mills;
coordination and allocation of human resources to different process steps;
preventive or predictive maintenance of the textile machines.

3. The textile mill system according to claim 1, wherein the operational information received from the spinning mills and the textile machines includes one or more of the following:
plant identification information to identify the spinning mills;
machine identification information to identify each of the textile machines;
unit identification information to identify individual machine units of the textile machines;
information from sensors and auxiliary spinning devices.

4. The textile mill system according to claim 1, wherein the computer system is further configured to implement training the neural network based on training data relating to production tests and trials, wherein the training data is adjusted beforehand using information from the Case-Based Reasoning system or the mathematical control and filtering section applying mathematical models.

5. The textile mill system according to claim 1, wherein the computer system further comprises:
   a second database having stored reference data regarding production tests and trials;
   a third database having stored empirical data collected from textile specialists of spinning mills or from textile technologists; and
   a fourth database having stored adapted machine parameters; and
   wherein the optimizer section and the neural network are further configured to determine the adapted machine parameters using data stored in one or more of the second, third, or fourth databases.

6. The textile mill system according to claim 5, wherein at least a part of one or more of the first, second, third, and fourth databases is configured as an unstructured database or as a structured database.

7. The textile mill system according to claim 1, wherein the computer system further comprises a transmission section configured to transmit the adapted machine parameters to the spinning mills and the textile machines.

8. The textile mill system according to claim 1, wherein the processing section further includes a validity check section configured to check validity of the adapted machine parameters.

9. A computerized method of determining adapted machine parameters for textile machines and processes within spinning mills with respect to one or more of the following: production quality, usage of raw material, reduced waste, conversion costs including one or more of costs of energy, labor costs, maintenance costs and consumables costs, increase of production volume, and ideal batch allocation to different ones of the textile machines within the spinning mills, the method comprising:
   receiving operational information from the spinning mills and the textile machines in a receiving and transmitting section of a computer system, the computer system having a processing section with an optimizer section;
   storing the received operational information in a first database of the computer system;
   using a neural network in the optimizer section to determine the adapted machine parameters, wherein the neural network uses the operational information stored in the first database and processes for or derived from supervised or unsupervised, machine or deep learning; and
   checking the adapted machine parameters by assigning a probability value to a difference between the adapted machine parameters and information derived from one or both of a Case-Based Reasoning system and a mathematical control and filtering section.

10. The method according to claim 9, wherein the adapted machine parameters define one or more of one of the following:
    raw material input;
    allocations of spinning machines to individual batch mixes of raw material qualities;
    specific allocation of bales in a blow room;
    optimal use of textile machines;
    operation of the textile machines;
    specific components of the textile machines;
    process settings and definitions;
    settings of auxiliary systems;
    definition of material flow within the spinning mills;
    coordination of operators and their tasks with the spinning mills;
    coordination and allocation of human resources to different process steps;
    preventive or predictive maintenance of the textile machines.

11. The method according to claim 9, wherein the operational information received from the spinning mills and the textile machines includes one or more of the following:
    plant identification information to identify the spinning mills;
    machine identification information to identify each of the textile machines;
    unit identification information to identify individual machine units of the textile machines;
    information from sensors and auxiliary spinning devices.

12. The method according to claim 9, further comprising training the neural network based on training data relating to production tests and trials, wherein the training data is adjusted beforehand using information from the Case-Based Reasoning system or the mathematical control and filtering section applying mathematical models.

13. The method according to claim 9, further comprising determining the adapted machine parameters using one or more of:
    a second database having stored reference data regarding production tests and trials;
    a third database having stored empirical data collected from textile specialists of spinning mills or from textile technologists; and
    a fourth database having stored adapted machine parameters.

14. The method according to claim 9, further comprising transmitting the adapted machine parameters to the spinning mills and the textile machines.

15. The method according to claim 9, further comprising checking the validity of the adapted machine parameters.

* * * * *